United States Patent

Matsuoka et al.

[11] Patent Number: 6,111,624
[45] Date of Patent: Aug. 29, 2000

[54] LIQUID CRYSTAL DISPLAY APPARATUS HAVING DUMMY COLOR FILTERS NEAR THE INJECTION PORT TO INTERCEPT SPACERS DURING FILLING

[75] Inventors: Hideki Matsuoka; Takao Suzuki; Norio Oku, all of Gifu, Japan

[73] Assignee: Sanyo Electric Co., Ltd., Osaka, Japan

[21] Appl. No.: 09/160,479

[22] Filed: Sep. 25, 1998

[30] Foreign Application Priority Data

Sep. 30, 1997 [JP] Japan ................................. 9-267185

[51] Int. Cl.[7] .......................... G02F 1/1335; G02F 1/1339
[52] U.S. Cl. .......................... 349/106; 349/154; 349/155
[58] Field of Search .......................... 348/192, 110, 348/157, 155, 106; 349/154

[56] References Cited

U.S. PATENT DOCUMENTS

| | | | |
|---|---|---|---|
| 3,700,802 | 10/1972 | Markin et al. | 178/7.3 D |
| 4,640,583 | 2/1987 | Hoshikawa et al. | 350/343 |
| 5,617,230 | 4/1997 | Ohagwara et al. | 349/110 |
| 5,650,867 | 7/1997 | Kojima et al. | 349/104 |
| 5,844,645 | 12/1998 | Kashimoto | 349/106 |

*Primary Examiner*—Walter Malinowski
*Attorney, Agent, or Firm*—Hogan & Hartson LLP

[57] ABSTRACT

Dummy filters which are irrelevant to displaying are arranged in a matrix consecutively with respect to color filter lines or columns close to a pouring opening. Although spacers move toward the pouring opening when the substrates are pressed for attachment, the moving spacers are stopped by and gathered around the dummy filters. This can prevent a pixel area from being adversely affected due to a light-less phenomenon.

4 Claims, 6 Drawing Sheets

LIQUID CRYSTAL DISPLAY APPARATUS HAVING DUMMY COLOR FILTERS NEAR THE INJECTION PORT TO INTERCEPT SPACERS DURING FILLING

BACKGROUND OF THE INVENTION

1. Field of the Invention

The present invention relates to a liquid crystal display (LCD) apparatus, and particular to an LCD which solves a problem of a spacer which is provided to ensure a space between a pair of attached substrates.

2. Description of the Prior Art

A liquid crystal display (LCD) apparatus is made by attaching to a pair of electrode substrates, predetermined electrode wires formed thereon while leaving an intervening space, and pouring liquid crystal into the space to be enclosed therein. The resultant LCD has a capacitor using the liquid crystal as a dielectric layer of a display pixel. Such an LCD is used as a display for office automation and audio visual equipment because of its advantageously small, thin size and low power consumption.

Referring to FIG. 4 which is a plan view of an LCD, the LCD has a lower substrate 1, an upper substrate 2, a sealing member 3, a spacer 4, an opening 5, an enclosing member 6, and a pixel area 7. Electrodes on one side of display pixel capacitor is formed on the substrate 1, and the electrodes on the other side are formed on the substrate 2. The substrates 1 and 2 are attached to each other around the edges thereof using the sealing member 3. The spacer 4 is provided between the substrates 1 and 2 so as to ensure a space between them. The sealing member is partly cut off to thereby form the opening 5 via which liquid crystal is poured into the space between the substrates 1 and 2. The enclosing member 6 encloses the liquid crystal in the space between the substrates 1 and 2. The pixel area 7 is provided with color filters for coloring light which passes through the display pixel capacitor and respective display pixels for color displaying.

Lower and upper substrates 1 and 2 are generally made in the form of a mother substrate including a number of such substrates 1 and 2. The lower substrate 1 generally provided with dispersing spacers 4 is attached to the upper substrate 2 coated with a sealing member. The laminated substrates 1 and 2 are pressed and heated to thereby harden the sealing member 3, so that a number of continuous bodies (receptacles for liquid crystal) for LCD apparatuses are made which have a predetermined width including a thin space inside. After separating the bodies, liquid crystal is poured into each thin space via the pouring opening 5, and the opening 5 is enclosed by enclosing a member, whereby an LCD apparatus is finished.

In the LCD apparatus shown in FIG. 4, light-less phenomenon is observed in the area near the pouring opening 5 in the pixel area 7, i.e., a light-less area 8.

Referring to FIGS. 5 and 6 which are an enlarged plan view and a cross sectional view along the line VI—VI in FIG. 5, respectively, of an area near a light-less area 8, color filters are arranged in a matrix corresponding to respective display pixels, and spacers 4 are gathered around the lower edge, i.e., on the pouring opening 5 side, of the color filter 11. The gathered spacers 4 may cause a color-less phenomenon.

The reason for the gathered spacers 4 may be considered as follows. Since a color-less phenomenon due to gathered spacers 4 is observed before liquid crystal is poured into the intervening space of the substrates 1 and 2, it is known that the spacers 4 had gathered before the step of attaching the substrates 1 and 2. Here, the particle diameter 4 of each spacer 4 is determined according to elasticity of the spacer 4, the width of the intervening space of the substrates 1 and 2, i.e., a cell gap, and a given pressure. With the substrates 1 and 2 attached to each other, spacers 4 are sandwiched by them in a slightly deformed shape due to the pressure. The width of the intervening space with a color filter of about 1 $\mu$m thickness is different from that of the intervening space without a color filter. That is, a cell gap is different between where there is a color filter exists and where there is not. Note that, when the substrates 1 and 2 which are respectively provided with spacers 4 and sealing members 3 are attached and pressed, the air between the substrates 1 and 2 flows out via the pouring opening 5, causing spacers 4 to move. The spacers 4 at areas without a color filter 11 move more freely as they are pressed only slightly by the substrates 1 and 2, and are discharged via the pouring opening 5. On the other hand, the spacers 4 at areas with a color filter 11 can hardly move as they are pressed strongly by the substrates 1 and 2, and thus move only slightly along the color filter 11. The spacers 4 moving from the area with a color filter 11 to the area without a color filter 11 are also discharged via the pouring opening 5. Therefore, spacers 4 may gather around the area with a color filter 11 closest to the pouring opening 5.

SUMMARY OF THE INVENTION

According to the present invention, a dummy filter is arranged between color filters and the pouring opening, in which the dummy filter is irrelevant to displaying. With this arrangement, spacers moving due to the air discharged via the pouring opening gather around the part corresponding to the dummy filter, so a light-less phenomenon due to gathered spacers is prevented from adversely affecting displaying status.

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENTS

Figure 1:
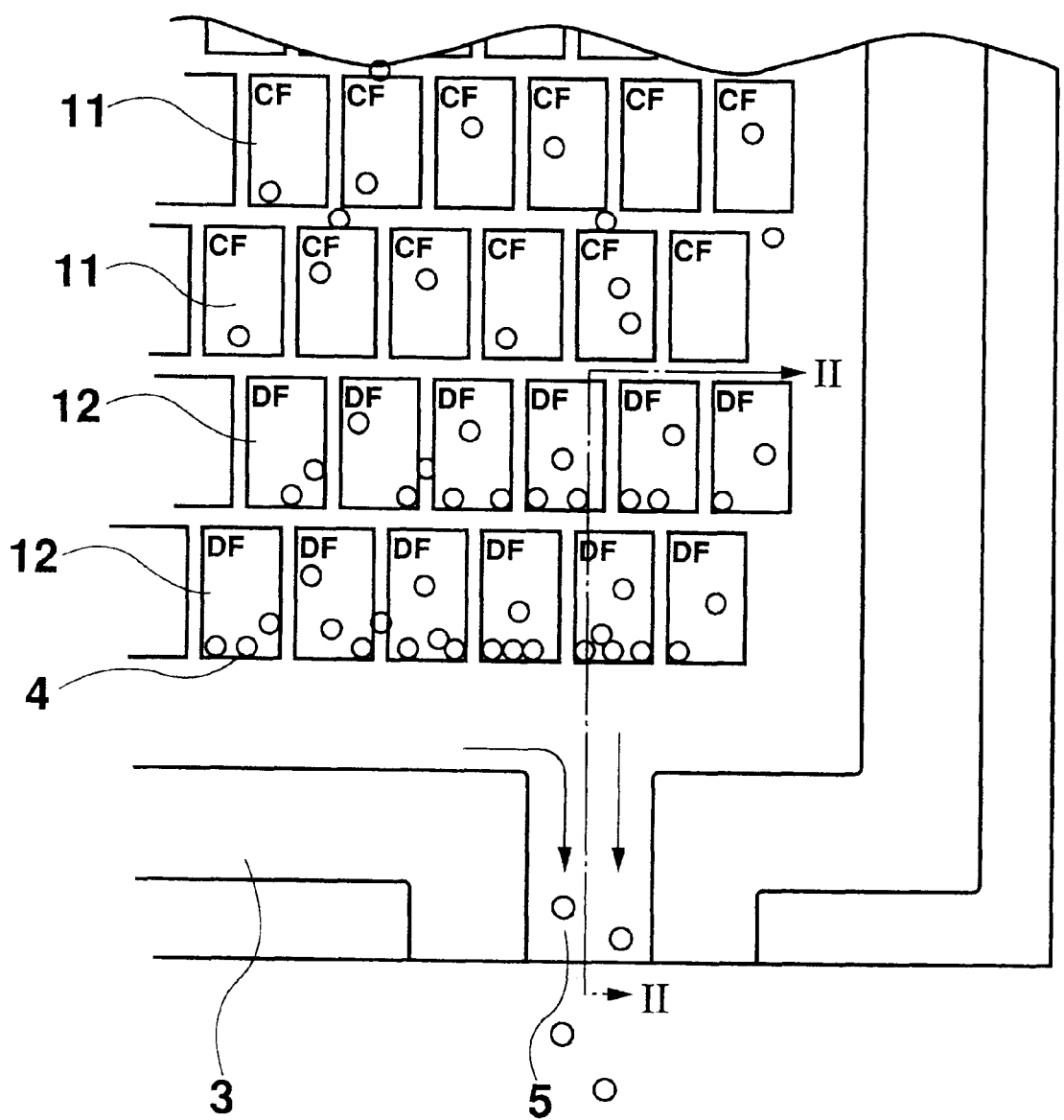
FIG. 1 is an enlarged plan view showing an LCD apparatus according to a first preferred embodiment of the present invention.
Figure 2:
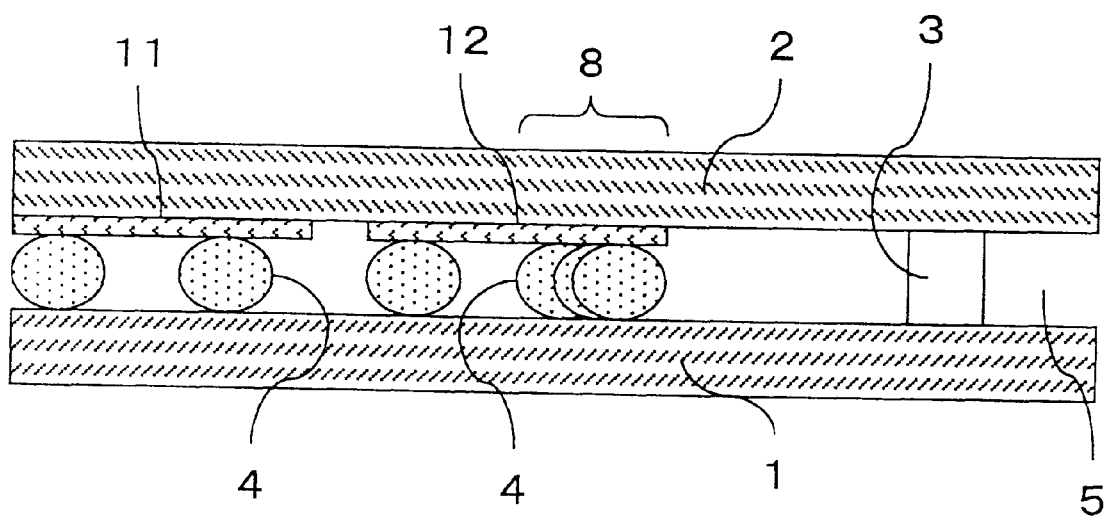
FIG. 2 is an enlarged cross sectional view showing an LCD apparatus according to the first preferred embodiment of the present invention along the line II—II in FIG. 1.

Referring to FIGS. 1 and 2 which are respectively an enlarged plan view and enlarged cross sectional view along the line II—II in FIG. 1 of an area of an LCD in the vicinity of the pouring opening according to a first preferred embodiment, electrodes on one side of display pixel capacitor are formed on the lower substrate 1, while those on the other side are formed on the upper substrate 2. The substrates 1 and 2 are attached to each other at the edges thereof by the sealing member 3, ensuring a thin space between them using spacers 4. The sealing member 3 is partly cut off in the column direction, i.e., in the left-right direction in FIG. 1, thereby forming a pouring opening 5 via which liquid crystal is poured into the internal thin space. In the pixel area, color filters are arranged in a matrix corresponding to respective display pixels on the upper substrate 2.

A spacer 4 may be a fine particle of glass fiber, plastics, or the like, having, for example, a 3.8 $\mu$m diameter. When the spacers 4 are sandwiched and pressed by the substrates 1 and 2, the cell gap is formed to be 3.5 $\mu$m. Each color filter 11 may be, for example, of 80 $\mu$m×of 60 $\mu$m (vertical× horizontal) in size, and arranged having a space of 50 $\mu$m to the vertically adjacent one and of 16 $\mu$m to the horizontally adjacent one.

According to the present invention, as shown in FIGS. 1 and 2, one or more lines of second color filters 12, or dummy filters irrelevant to displaying, are arranged consecutively with respect to the arranged color filters 11 on the pouring opening 5 side. Specifically, second color filters 12 each having the same size as that of color filters 11 are arranged at the same pitch as the color filters 11. Note that, in the drawings, color filters 11 are represented as "CF", while dummy color filters 11 are represented as "DF".

When the substrates 1 and 2 are pressed while retaining spacers 4 are arranged between them, the inside air flows out via the pouring opening 5, which causes the spacers 4 to move toward the opening 5. Spacers 5, which move similarly in areas with and without color filters 11 and 12, tend to gather around the edges of color filters 11 and 12 closest to the opening 5.

Therefore, according to the present invention, the closet one or more lines of color filters to the pouring opening 5 comprise dummy color filters 11 which have nothing to do with displaying, so that moving spacers 4 gather around these dummy filters 12. As a result, a display condition will not be adversely affected by light-less phenomenon caused by gathered spacers 4. Note that a dummy color filter 12 may be made using light-opaque resin containing light-shielding pigments. Alternatively, the area of the outer surface of the substrate 2, namely the area corresponding to the dummy color filter 12, may be covered by a light-shielding film so that light will not pass through the concerned area. This arrangement will not adversely affect a displaying condition. Note that when a light-shielding film is used, the dummy color filters 12 and color filters 11 may be made using the same material. A light-shielding film may be provided to either the lower or upper substrate 1 or 2, and to either the inner or outer surface thereof.

Generally, the number of dummy color filter 12 rows is determined so as to cover the area where gathered spacers 4 are significantly recognized. It is preferable in view of manufacturing costs to determine the number so as to cover the largest one of such areas of all such apparatuses which employ an upper substrate 2 with color filters 11, 12 formed thereon.

Figure 3:
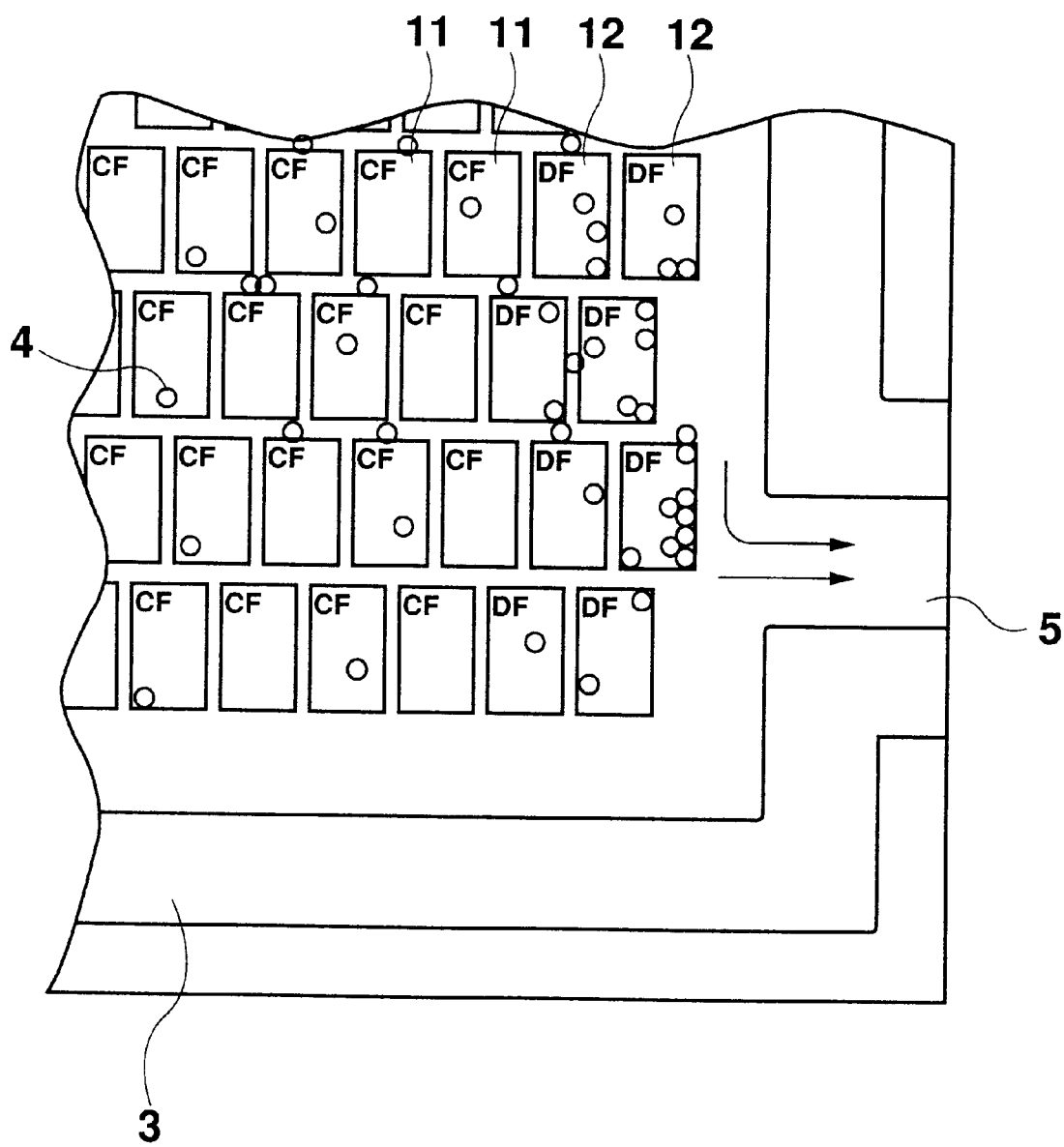
FIG. 3 is an enlarged plan view showing an LCD apparatus according to a second preferred embodiment of the present invention.
Figure 4:
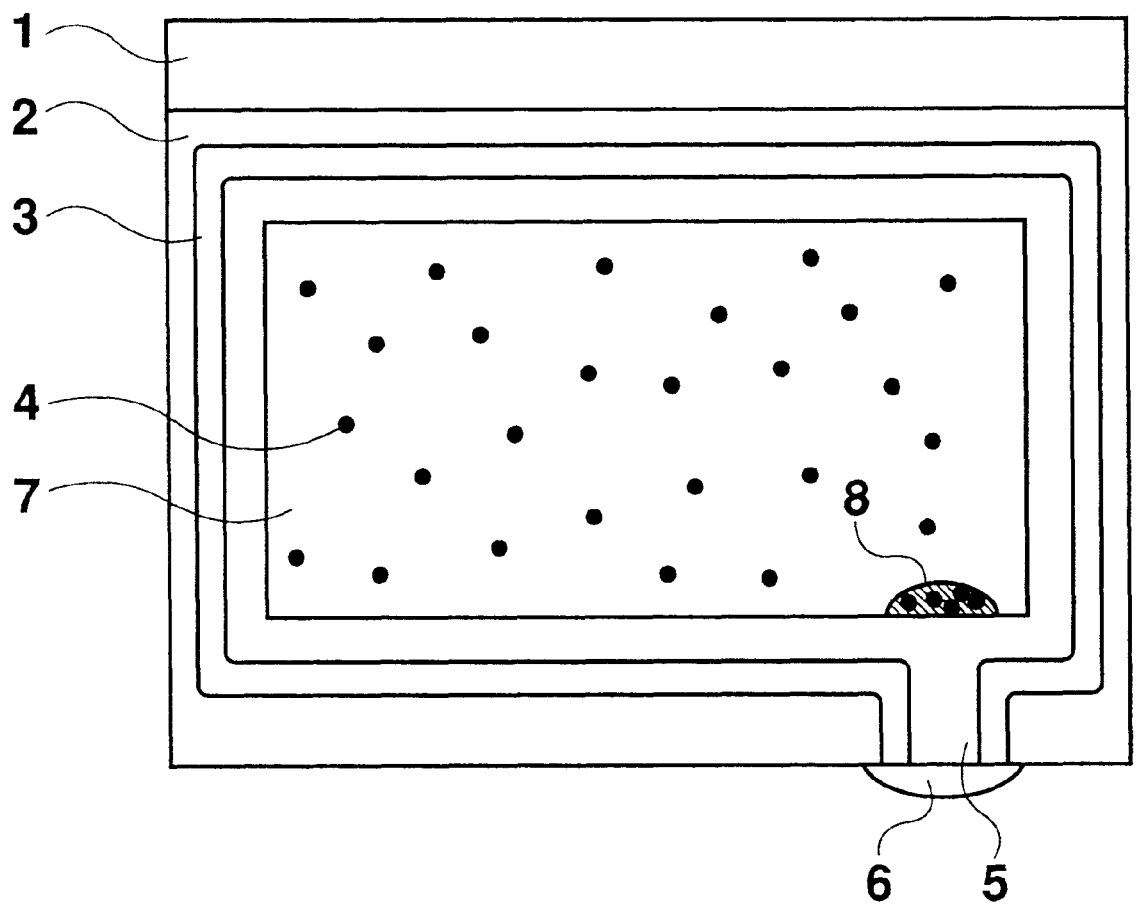
FIG. 4 is a plan view of an LCD apparatus.
Figure 5:
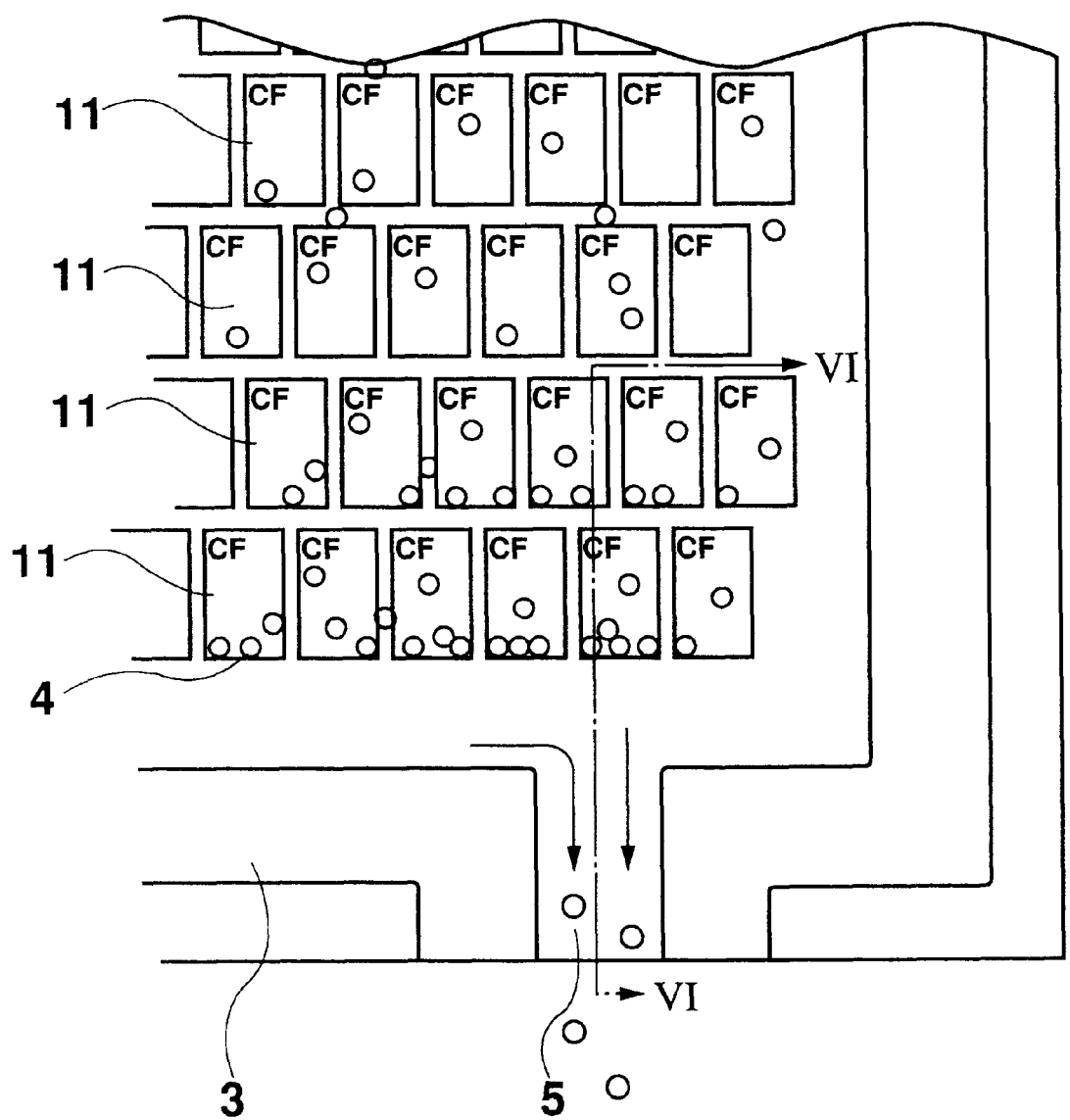
FIG. 5 is an enlarged plan view showing a conventional LCD apparatus.
Figure 6:
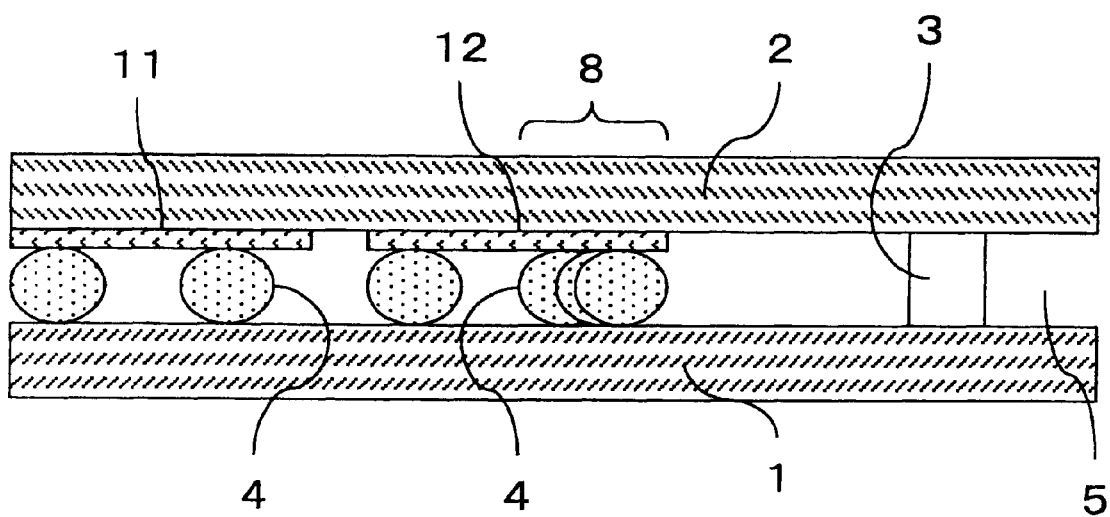
FIG. 6 is an enlarged cross sectional view of a conventional LCD apparatus along the line VI—VI in FIG. 5.

Here, in a structure, for example, in which dummy color filters 12 are not provided and color filters 11 are arranged away from the pouring opening 5, i.e., having space between the color filters 11 and the opening 5 substantially equivalent to the space which dummy color filters 12 would occupy, gathered spacers 10 are recognized around the edges of the color filters 11. That is, it is experientially known that the space, or the distance, between color filters and the pouring opening 5 is not critical to solve this problem. Referring to FIG. 3 which is an enlarged plan view showing an area close to the pouring opening of an LCD according to a second preferred embodiment, the sealing member 3 extending vertically, or in the up-down direction in the drawing, is cut off, thereby forming a pouring opening 5. Spacers thus gather around the right edges of the color filters in the rightmost column, i.e., color filters closest to the pouring opening 5. In particular, since these color filters 11 are vertically long, the light-less phenomenon may be caused to two or more color filter columns due to the gathered spacers 4, different from FIG. 1. In order to solve this problem, according to this embodiment, two or more columns of dummy color filters 12 are arranged consecutive with respect to the arranged color filters 11 on the pouring opening 5 side. Specifically, second color filters 12 each having the same size as that of color filters 11 are arranged at the same pitch as the color filters 11. With this arrangement, a light-less area due to gathered spacers 4 are resultantly positioned outside the pixel area so that the light-less phenomenon will not adversely affect displaying.

Generally, the number of dummy color filter 12 columns is determined so as to cover the area where gathered spacers 4 are significantly recognized. It is preferable in view of manufacturing costs to determine the number so as to cover the largest one of such areas of all such apparatuses which employ an upper substrate 2 with color filters 11, 12 formed thereon. Further, for application to any structures in which the pouring opening 5 is formed on either the vertical or horizontal edge of the substrate, it is preferable to provide dummy color filters 12 outside the outmost color filter columns and lines. Further preferably, dummy color filters 12 are provided around the color filters 11.

In the above, color filter rows and columns are exchangeable. Color filters may be arranged not only in a triangular shape (positions of color filters in a row are shifted from those of the next row) but also in a stripe shape (positions are not shifted)

According to the present invention, dummy color filters irrelevant to displaying are provided between the pouring opening and color filters. With this arrangement, although spacers for ensuring space between the upper and lower substrates are moved toward the pouring opening due to the pressure given to attach the upper and lower substrates, since they gather in a part corresponding to the dummy color filters, light-less phenomenon due to the gathered spacers will not adversely affect a displaying condition.

What is claimed is:

1. A liquid crystal apparatus, comprising:

a pair of electrode substrates attached to each other at edges thereof by an adhesive member;

a plurality of spacers for ensuring space between the electrode substrates for enclosing liquid crystal;

a plurality of color filters arranged in matrix corresponding to a pixel area on an inner surface of at least one of the pair of electrode substrates;

a pouring opening formed on the adhesive member via which the liquid crystal is poured; and a plurality of dummy filters irrelevant to displaying provided between the color filters and the pouring opening, wherein the dummy filters have substantially the same shape as the color filters and are separated from each other by a spacing that is substantially the same as a spacing separating the color filters.

2. A liquid crystal apparatus according to claim 1, wherein the plurality of color filters form a plurality of lines in a first direction, wherein the pouring opening is formed on the edge of an electrode substrate, the edge being substantially parallel to the first direction, and the dummy filters form at least one line in the first direction.

3. A liquid crystal apparatus according to claim 1, wherein the dummy filter comprises light-opaque resin.

4. A liquid crystal apparatus according to claim 1, wherein a light shielding film is provided at an area where the dummy filter is arranged.

* * * * *